United States Patent
Kempf et al.

(10) Patent No.: US 9,290,092 B2
(45) Date of Patent: Mar. 22, 2016

(54) CHAIN DRIVE POWER TAKE OFF FOR HYDRAULIC PUMP

(71) Applicant: GM Global Technology Operations LLC, Detroit, MI (US)

(72) Inventors: Gregory W. Kempf, Avon, IN (US); Chi Teck Lee, Noblesville, IN (US); Greg B. Witczak, Indianapolis, IN (US); Trevor Murray, Indianapolis, IN (US)

(73) Assignee: GM Global Technology Operations LLC, Detroit, MI (US)

( * ) Notice: Subject to any disclaimer, the term of this patent is extended or adjusted under 35 U.S.C. 154(b) by 238 days.

(21) Appl. No.: 13/915,178

(22) Filed: Jun. 11, 2013

(65) Prior Publication Data
US 2014/0360290 A1    Dec. 11, 2014

(51) Int. Cl.
*B60K 17/28* (2006.01)
*B60K 25/02* (2006.01)
*F16H 57/02* (2012.01)

(52) U.S. Cl.
CPC ........... *B60K 17/28* (2013.01); *B60K 2025/022* (2013.01); *B60Y 2200/14* (2013.01); *F16H 2057/02026* (2013.01)

(58) Field of Classification Search
CPC ............ F16H 61/0025; F16H 61/0031; F16H 57/0441; F16H 2700/02; F16H 55/30; F16H 2057/02026; B60K 2025/022; B60K 2025/065; B60K 17/28; B60Y 2200/14
USPC .......................................... 74/15.86; 180/53.4
See application file for complete search history.

(56) References Cited

U.S. PATENT DOCUMENTS

| | | | | | |
|---|---|---|---|---|---|
| 2,508,756 | A | * | 5/1950 | Jackoboice | 290/1 R |
| 2,674,188 | A | * | 4/1954 | Young | 417/246 |
| 2,940,534 | A | * | 6/1960 | Chattin | 180/53.1 |
| 3,153,326 | A | * | 10/1964 | Madson | 60/358 |
| 3,603,296 | A | * | 9/1971 | Mitchell | 123/41.46 |
| 3,828,878 | A | * | 8/1974 | Clapsaddle, Jr. | 180/53.7 |
| 4,031,761 | A | * | 6/1977 | Fisher et al. | 74/15.63 |
| 4,095,579 | A | * | 6/1978 | Iwasa et al. | 123/192.2 |
| 4,241,614 | A | * | 12/1980 | Gould et al. | 74/15.63 |
| 4,459,123 | A | * | 7/1984 | Tatsunaka et al. | 474/87 |
| 4,577,712 | A | * | 3/1986 | Foote et al. | 180/53.4 |
| 4,825,970 | A | * | 5/1989 | McVicar et al. | 180/53.7 |
| 4,870,820 | A | * | 10/1989 | Nemoto | 60/487 |
| 5,094,309 | A | * | 3/1992 | Vlaanderen et al. | 180/53.7 |
| 5,165,139 | A | * | 11/1992 | Oxman | 15/321 |
| 5,172,786 | A | * | 12/1992 | Ishibashi et al. | 180/190 |
| 5,588,325 | A | * | 12/1996 | Green et al. | 74/15.63 |
| 6,109,227 | A | * | 8/2000 | Mott | 123/90.31 |
| 6,142,902 | A | * | 11/2000 | Ichikawa et al. | 474/212 |
| 6,189,412 | B1 | * | 2/2001 | Tsubata et al. | 74/606 R |
| 6,251,042 | B1 | * | 6/2001 | Peterson et al. | 477/3 |
| 6,267,701 | B1 | * | 7/2001 | Mott | 474/164 |

(Continued)

*Primary Examiner* — Laura Freedman

(57) ABSTRACT

A chain drive power take off assembly drives a hydraulic fluid pump from a torque converter input of a motor vehicle. The assembly includes a first, chain drive sprocket which is coupled to and driven by a engine output/torque converter input member such as an engine crankshaft or transmission input member, a chain and a second, driven chain sprocket which is coupled to a stub shaft and which, in turn, is coupled to an input shaft of the hydraulic pump. The driven sprocket resides in a housing secured to the side of the transmission and the pump is secured to the housing with its input shaft and axis of rotation disposed offset from and parallel to the axis of rotation of the transmission and torque converter input member.

19 Claims, 3 Drawing Sheets

(56) References Cited

U.S. PATENT DOCUMENTS

| | | | |
|---|---|---|---|
| 6,269,895 B1* | 8/2001 | Tanuguchi et al. | 180/65.25 |
| 6,453,865 B2* | 9/2002 | Hirose et al. | 123/179.4 |
| 6,626,053 B2* | 9/2003 | Baxter et al. | 74/15.86 |
| 6,644,939 B2* | 11/2003 | Vukovich et al. | 417/374 |
| 6,656,083 B2* | 12/2003 | Esaki | 477/5 |
| 6,712,652 B2* | 3/2004 | Roycroft | 440/12.51 |
| 6,810,772 B2* | 11/2004 | Hamaoka et al. | 74/731.1 |
| 6,840,208 B2* | 1/2005 | Lawrence | 123/192.2 |
| 6,881,165 B2* | 4/2005 | Endo et al. | 474/28 |
| 7,044,100 B2* | 5/2006 | Stone | 123/198 R |
| 7,059,985 B2* | 6/2006 | Markley et al. | 474/213 |
| 7,494,439 B2* | 2/2009 | Pashnik et al. | 475/159 |
| 7,870,915 B2* | 1/2011 | Beeson et al. | 180/53.1 |
| 8,042,331 B2* | 10/2011 | Schultz et al. | 60/449 |
| 8,230,954 B2* | 7/2012 | Majkrzak | 180/53.4 |
| 8,317,652 B2* | 11/2012 | Hladun et al. | 477/5 |
| 8,328,673 B2* | 12/2012 | Smith et al. | 475/5 |
| 8,573,953 B2* | 11/2013 | Toi et al. | 417/360 |
| 8,590,424 B2* | 11/2013 | Nonomura et al. | 74/606 R |
| 8,757,119 B2* | 6/2014 | Suzuki | 123/179.25 |
| 8,808,124 B2* | 8/2014 | Major et al. | 475/5 |
| 8,833,337 B2* | 9/2014 | Xykis et al. | 123/198 C |
| 2006/0054413 A1* | 3/2006 | Nishiyama et al. | 184/6.28 |
| 2007/0117665 A1* | 5/2007 | Yamazaki | 474/28 |
| 2011/0132141 A1* | 6/2011 | Mizuno et al. | 74/730.1 |
| 2012/0060485 A1* | 3/2012 | Yamada et al. | 60/436 |
| 2013/0123053 A1* | 5/2013 | Haupt et al. | 474/91 |
| 2013/0149110 A1* | 6/2013 | Pummell et al. | 415/122.1 |
| 2013/0309104 A1* | 11/2013 | Schultz et al. | 417/319 |

* cited by examiner

CHAIN DRIVE POWER TAKE OFF FOR HYDRAULIC PUMP

FIELD

The present disclosure relates to a drive assembly for a hydraulic pump associated with a motor vehicle transmission and more particularly to a chain drive power take off assembly for driving a hydraulic fluid pump from a torque converter input of a motor vehicle automatic transmission.

BACKGROUND

The statements in this section merely provide background information related to the present disclosure and may or may not constitute prior art.

It is common practice to mount a power take off (PTO) to an automatic transmission of a motor vehicle, especially heavy duty pickups and commercial vehicles, to provide power for auxiliary devices such as lift gates, snow plows, dump beds, generators, fluid pumping and the like. The power take off generally provides a mounting surface and drives a dedicated hydraulic pump which provides pressurized hydraulic fluid that may be utilized to drive the above-listed components and others. The power take off is generally driven by the automatic transmission. The obvious appeal of such an arrangement is that the power take off and pump can provide fluid power to various devices which may be interchanged to fit various vehicles and applications, all driven by the automatic transmission.

Various drive configurations have been proposed and utilized. The standard drive configuration comprises a first, drive gear coupled to an on-axis rotating component of the transmission which engages and drives a second, driven gear which is coupled to an input shaft of the power take off. The drive gear may be coupled to and driven by an engine output/torque converter pump member such as the torque converter pump hub. Alternatively, the drive gear may be coupled to and driven by the torque converter turbine member such as the transmission turbine shaft in which case the drive gear will not rotate when the vehicle is stationary.

SUMMARY

The present invention provides a chain drive power take off assembly for driving a hydraulic fluid pump from a torque converter pump member of an automatic transmission. The assembly includes a first, chain drive sprocket which is coupled to and driven by an engine output/torque converter pump member such as the torque converter pump hub, a chain and a second, driven chain sprocket which is coupled to an input member of the hydraulic pump. The driven chain sprocket is located and supported in an intermediate housing secured to the side of the transmission and the pump is secured to the intermediate housing with its input shaft and axis of rotation disposed offset from and parallel to the axis of rotation of the transmission and torque converter pump member.

Thus it is an aspect of the present invention to provide a power take off for a motor vehicle such as a heavy duty pickup or commercial duty vehicle.

It is a further aspect of the present invention to provide a chain driven power take off for a motor vehicle such as a heavy duty pickup or commercial duty vehicle.

It is a still further aspect of the present invention to provide a chain driven hydraulic pump power take off for a motor vehicle such as a heavy duty pickup or commercial duty vehicle.

It is a still further aspect of the present invention to provide a power take off for a motor vehicle having a chain driven by the torque converter input.

It is a still further aspect of the present invention to provide a power take off for a motor vehicle transmission having a chain driven by the torque converter input.

It is a still further aspect of the present invention to provide a hydraulic pump power take off for a motor vehicle transmission having a chain driven by the torque converter input.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
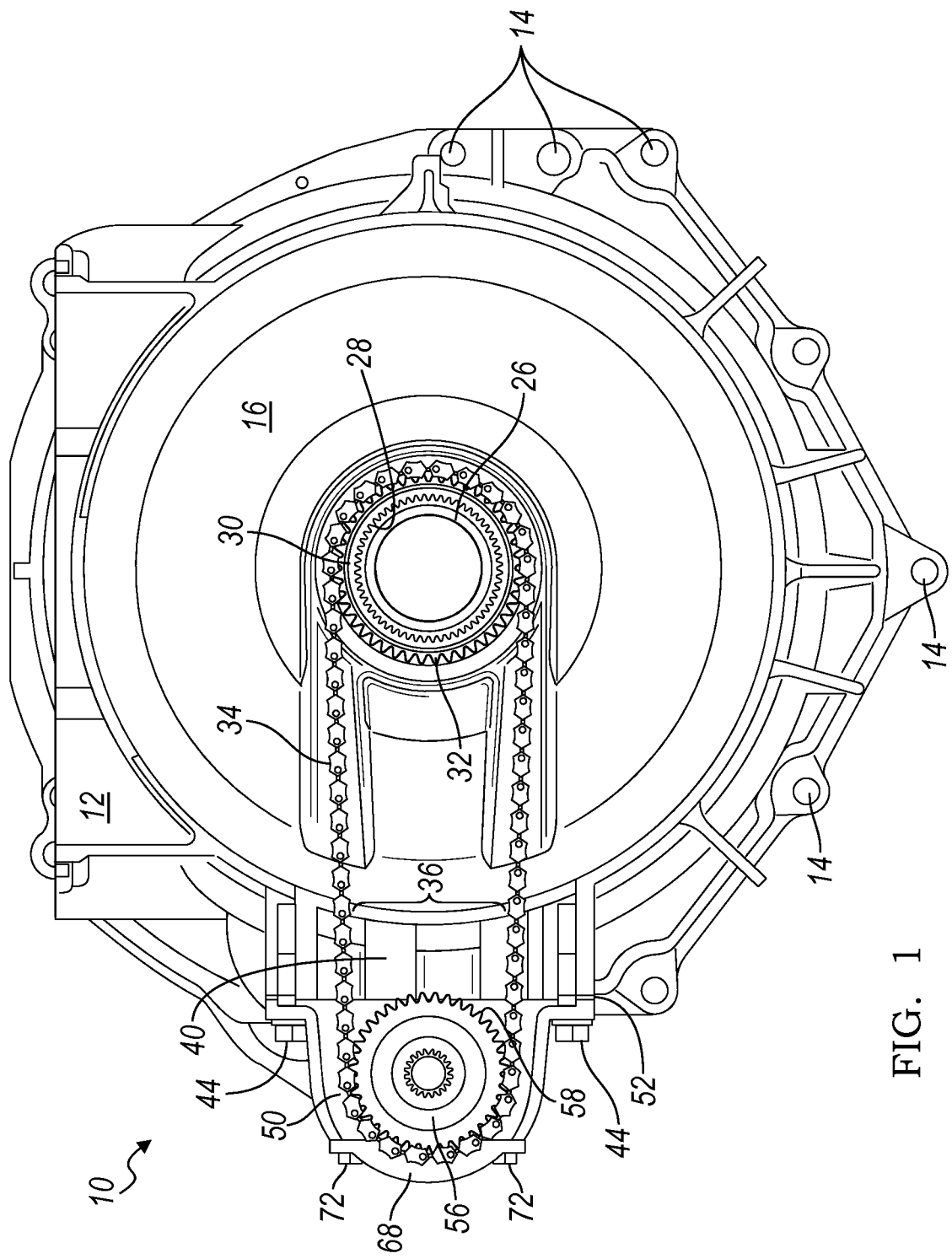
FIG. 1 is a elevational view of the rear of a torque converter of a motor vehicle automatic transmission incorporating the present invention.
Figure 2:
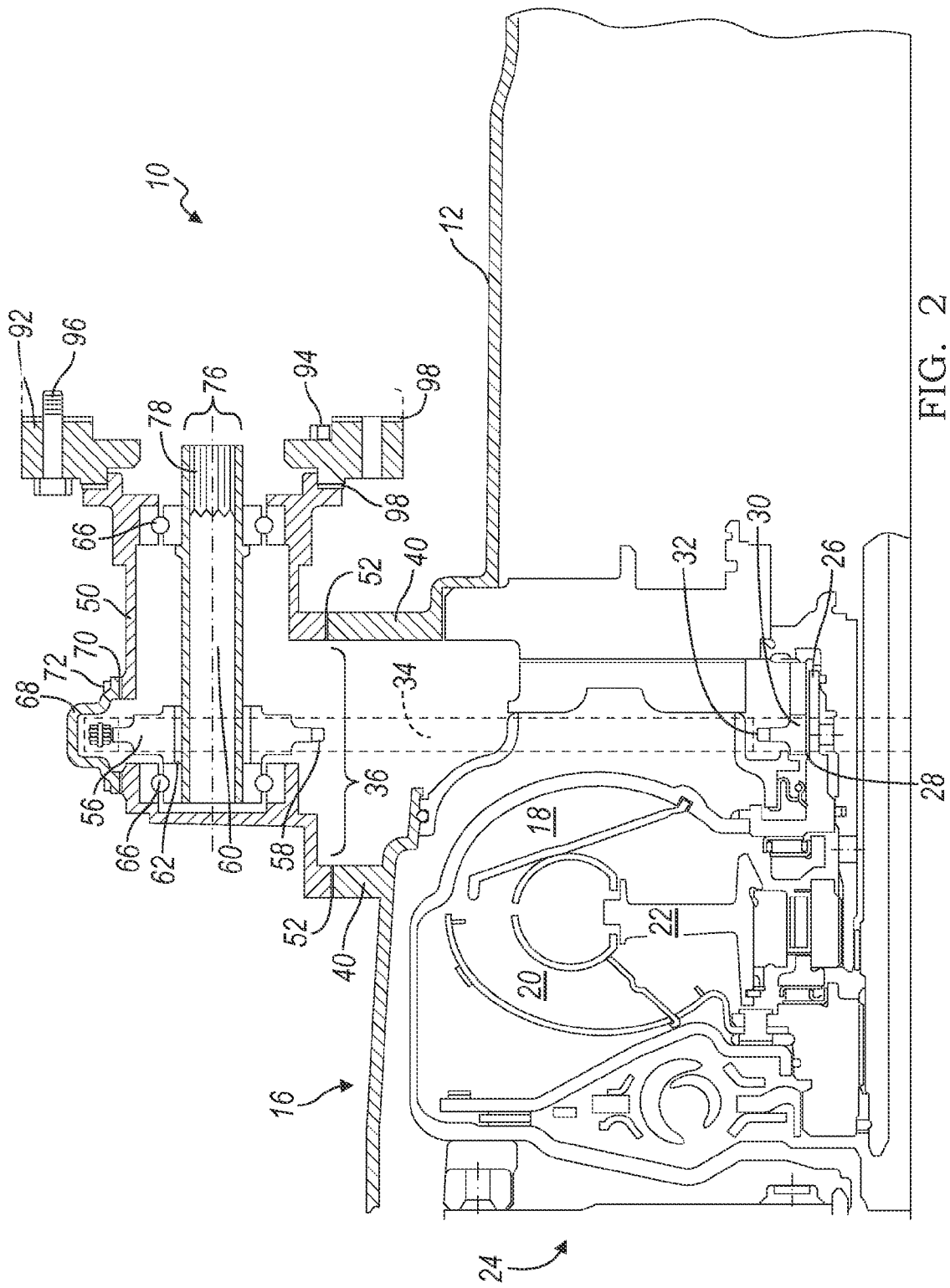
FIG. 2 is a half sectional view of a forward portion of a motor vehicle automatic transmission incorporating the present invention.

With reference to FIGS. 1 and 2, a portion of a motor vehicle automatic transmission is illustrated and generally designated by the reference number 10. Specifically, and as illustrated, the automatic transmission includes a housing 12 having a plurality of peripheral apertures or openings 14 through which a like plurality of threaded fasteners extend which attach the housing 12 of the automatic transmission 10 to the rear of a prime mover such as an internal combustion gasoline, Diesel or flex fuel engine or a hybrid power plant (all not illustrated).

Disposed within the housing 12 of the transmission 10 is a torque converter assembly 16 within which, in accordance with conventional practice includes, for example, a pump 18, a turbine 20 and a stator 22. Also in accordance with conventional practice, a flexplate or similar mechanism 24 is attached to and drives the torque converter pump 18 from the crankshaft (output shaft) of the prime mover (also not illustrated). The rear of the torque converter pump 18 includes a concentric rigidly attached shaft, collar or hub 26 which defines a first axis.

Integrally formed therewith, directly secured to or rotationally coupled to the shaft, collar or hub 26 by, for example, complementary interengaging male and female splines 28 is a chain drive sprocket 30. The chain sprocket 30 thus rotates at the output speed of the prime mover as well as the input speed of the torque converter 16 and is always rotating when the prime mover is active. The chain drive sprocket 30 includes a plurality of chain engaging teeth 32 disposed about its periphery. Wrapped about a portion of the chain drive sprocket 30 and engaged and driven by the plurality of teeth 32 is a single or multiple link chain 34.

The single or multiple link chain 34 extends through an opening 36 in a mounting plate or boss 40 which is preferably integrally formed with or in the housing 12 of the transmission 10. Alternatively, the mounting plate or boss 40 may be separately cast or fabricated and attached to the transmission housing 12 by any suitable means such as threaded fasteners.

Attached to the mounting plate or boss 40 by any suitable means such as a plurality of threaded fasteners, i.e., machine bolts 44, is an intermediate housing 50 sealed with a gasket 52. Disposed within the intermediate housing 50 on a second axis parallel to but spaced from the first axis of the collar or hub 26 and the chain drive sprocket 30 is a driven chain sprocket 56 having a plurality of chain engaging teeth 58 about its periphery which are engaged and driven by the single or multiple link chain 34. The driven chain sprocket 56 is coupled to a hollow stub shaft 60 by an interference fit, interengaging male and female splines 62 or other means such as a drive pin, set screws or radial expansion of the hollow stub shaft 60. Alternatively, the driven chain sprocket 56 and the stub shaft 60 may be integrally formed or fabricated from, for example powdered metal. The multiple link chain 34 is thus disposed in a plane perpendicular to both the first axis of the shaft or hub 26 and the stub shaft 60.

Figure 3:
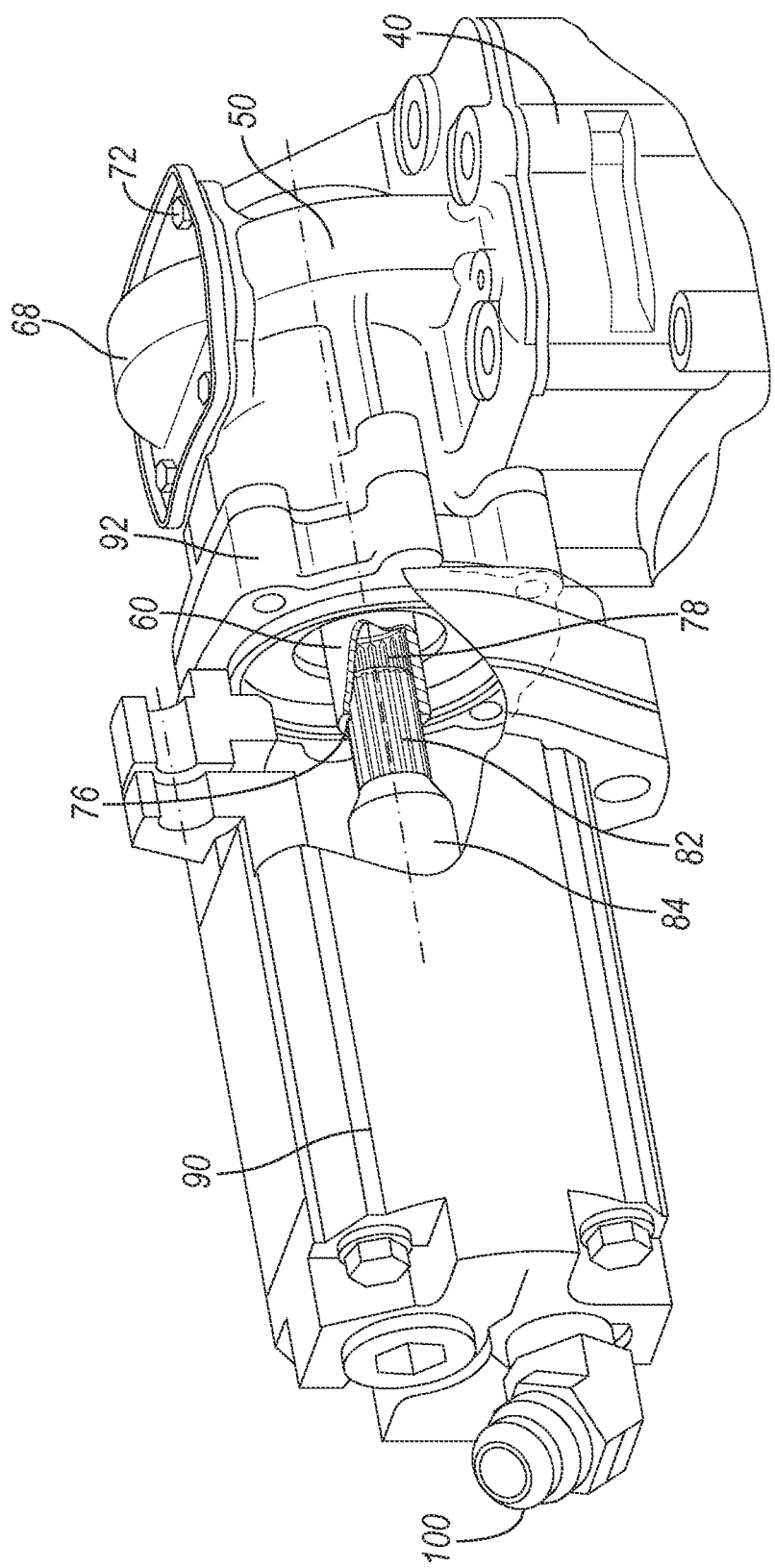
FIG. 3 is an enlarged, perspective view with a portion broken away of the exterior of a motor vehicle automatic transmission incorporating the hydraulic pump and intermediate housing of the present invention.

Referring now to FIGS. 1, 2 and 3, the stub shaft 60 is freely rotatably supported on bearings 66 which are, in turn, supported within the intermediate housing 50. Preferably, the intermediate housing 50 includes an access plate or cover 68 which includes a gasket 70 and is secured to the intermediate housing 50 by suitable threaded fasteners 72. The access plate or cover 70 provides selective access to the interior of the intermediate housing 50 to facilitate, for example, assembly, inspection and service of the single or multiple link chain 34 and other components.

The stub shaft 60 extends through the intermediate housing 50 and terminates in a re-entrant portion or socket 76 having, for example, a plurality of female splines 78 or similar internal teeth which engage and drive male splines 82 or similar external teeth on a pump input shaft 84 of a hydraulic pump 90. The hydraulic pump 90 may be directly secured to the intermediate housing 50 or to an adapting collar or ring 92 fastened to the intermediate housing 50 by a plurality of threaded fasteners 94 and in turn fastened to the hydraulic pump 90 by threaded fasteners 96 with both interfaces sealed by gaskets 98. The adapting collar or ring may be used to accommodate a wide range of mounting surfaces of different hydraulic pumps 90. The hydraulic pump 90 includes suitable inlet (suction) and outlet (discharge) fittings or connectors 100 which connect to supply (feed) and outlet (pressure) lines (not illustrated) in accordance with conventional practice.

It will be appreciated that a chain driven power take off according to the present invention provides several benefits. First of all, the chain drive assembly generally reduces the space within the transmission occupied by the power take off relative to a power take off utilizing gears. Second of all, and again relative to a geared device, the chain drive doesn't exhibit gear rattle issues due to engine torsional excitation and thus operates more quietly. Third of all, since the chain and the pump are driven from the input to the torque converter, whenever the prime mover is operating, power is supplied to the hydraulic pump. This is a significant and worthwhile improvement over configurations in which the power take off is driven by the output of the torque converter which only rotates and thus provides power when the vehicle is moving. Last of all, having the intermediate housing, the driven sprocket, the shaft, the adapting ring and the other components integral to the transmission allows a hydraulic pump to be quickly and directly installed without requiring the purchase of a power take off assembly, thereby providing significant value to the customer.

The description of the invention is merely exemplary in nature and variations that do not depart from the gist of the invention are intended to be within the scope of the invention. Such variations are not to be regarded as a departure from the spirit and scope of the invention.

What is claimed is:

1. A power take off for driving a hydraulic pump from a motor vehicle drive train comprising, in combination,
    a first housing supporting an input member of an automatic transmission torque converter defining a first axis,
    a chain drive sprocket coupled to said input member for rotation therewith;
    a second housing outside said first housing;
    a stub shaft disposed in said second housing, defining a second axis parallel to and spaced from said first axis and supported on at least one bearing disposed in said second housing;
    a driven chain sprocket coupled to said stub shaft for rotation therewith; and
    a chain engaged by and extending between said drive and driven chain sprockets;
    said hydraulic pump having a third housing outside said first housing and an input driven by said stub shaft.

2. The power take off for a hydraulic pump of claim 1 wherein said first housing is a transmission housing.

3. The power take off for a hydraulic pump of claim 1 wherein said input member includes a hub having a plurality of female splines.

4. The power take off for a hydraulic pump of claim 1 wherein said chain is a single or multiple link chain.

5. The power take off for a hydraulic pump of claim 1 wherein said driven chain sprocket is coupled to said stub shaft by interengaging male and female splines.

6. The power take off for a hydraulic pump of claim 1 wherein said chain is a multiple link chain and is disposed in a plane oriented perpendicularly to said first and said second axes.

7. A power take off assembly for driving a hydraulic pump from a transmission input comprising, in combination,
    a transmission housing supporting a rotatable torque converter input member defining a first axis;
    a chain drive sprocket driven by said input member;
    an intermediate housing secured to said transmission housing;
    a stub shaft rotatably supported in said intermediate housing and defining a second axis parallel to and spaced from said first axis;
    a driven chain sprocket rotatably coupled to said stub shaft;
    a chain engaged by and extending between said drive and driven chain sprockets; and
    said hydraulic pump having a pump housing outside said transmission housing supported by said intermediate housing and having an input driven by said stub shaft.

8. The power take off assembly for driving a hydraulic pump of claim 7 further including an adapting ring disposed between and secured to both said intermediate housing and said hydraulic pump housing.

9. The power take off assembly for driving a hydraulic pump of claim 7 wherein said stub shaft is supported on a pair of bearings disposed in said intermediate housing.

10. The power take off assembly for driving a hydraulic pump of claim 7 wherein said input of said pump is coupled to said stub shaft by interengaging male and female splines.

11. The power take off assembly for driving a hydraulic pump of claim 7 wherein said driven chain sprocket is coupled to said stub shaft by interengaging male and female splines.

12. The power take off assembly for driving a hydraulic pump of claim 7 wherein said chain is a single or multiple link chain and is disposed in a plane oriented perpendicularly to said first and said second axes.

13. The power take off assembly for driving a hydraulic pump of claim 7 wherein said hydraulic pump includes inlet and outlet fittings.

14. A power take off assembly for driving a hydraulic pump from an input of a motor vehicle transmission comprising, in combination,
- a transmission housing supporting a rotatable torque converter input member and defining an inside and an outside;
- a chain drive sprocket coupled to said input member for rotation therewith;
- an intermediate housing disposed on said outside of said transmission housing;
- a stub shaft rotatably supported in said intermediate housing;
- a driven chain sprocket secured to said stub shaft;
- a chain engaged by and extending between said drive and driven chain sprockets; and
- said hydraulic pump having a housing supported by said intermediate housing on said outside of said transmission housing and having an input coupled to said stub shaft.

15. The power take off assembly for driving a hydraulic pump of claim 14 wherein said input member includes a hub having a plurality of male splines and said chain drive sprocket includes a plurality of female splines engaged by said male splines on said hub of said input member.

16. The power take off assembly for driving a hydraulic pump of claim 14 wherein said driven chain sprocket is coupled to said stub shaft by interengaging male and female splines.

17. The power take off assembly for driving a hydraulic pump of claim 14 further including a splined socket in said stub shaft and a complementary splined input shaft of said hydraulic pump disposed in said splined socket.

18. The power take off assembly for driving a hydraulic pump of claim 14 said chain is a single or multiple link chain and is disposed in a plane oriented perpendicularly to an axis of said stub shaft.

19. The power take off assembly for driving a hydraulic pump of claim 14 wherein said stub shaft is supported on a pair of bearings disposed in said intermediate housing.

* * * * *